(12) United States Patent
Schaefer et al.

(10) Patent No.: US 7,553,569 B2
(45) Date of Patent: Jun. 30, 2009

(54) DYNAMIC CATHODE GAS CONTROL FOR A FUEL CELL SYSTEM

(75) Inventors: Robert Schaefer, Darmstadt (DE); Rainer Pechtold, Russelsheim (DE); Thorsten Rohwer, Trebur (DE)

(73) Assignee: GM Global Technology Operations, Inc.

( * ) Notice: Subject to any disclaimer, the term of this patent is extended or adjusted under 35 U.S.C. 154(b) by 149 days.

(21) Appl. No.: 11/106,334

(22) Filed: Apr. 14, 2005

(65) Prior Publication Data

US 2006/0234093 A1     Oct. 19, 2006

(51) Int. Cl.
*H01M 8/00* (2006.01)
(52) U.S. Cl. .............................. 429/13; 429/17; 429/22; 429/34; 429/38; 429/39
(58) Field of Classification Search ................... 429/13, 429/17, 22, 34, 39
See application file for complete search history.

(56) References Cited

U.S. PATENT DOCUMENTS

| | | | |
|---|---|---|---|
| 4,202,933 A * | 5/1980 | Reiser et al. ................... | 429/13 |
| 4,859,545 A * | 8/1989 | Scheffler et al. ............... | 429/17 |
| 6,093,502 A | 7/2000 | Carlstrom, Jr. et al. | |
| 6,103,409 A | 8/2000 | DiPierno Bosco et al. | |
| 6,322,914 B1 | 11/2001 | Chow et al. | |
| 6,497,970 B1 | 12/2002 | Fronk | |
| 6,576,359 B2 | 6/2003 | Fronk | |
| 2002/0041984 A1* | 4/2002 | Chow et al. .................... | 429/13 |
| 2005/0233182 A1* | 10/2005 | Fuss et al. ...................... | 429/12 |

\* cited by examiner

*Primary Examiner*—Patrick Ryan
*Assistant Examiner*—Ben Lewis
(74) *Attorney, Agent, or Firm*—Harness, Dickey & Pierce, P.L.C.

(57) ABSTRACT

A fuel cell system utilizes at least one flow restricting device to vary the stoichiometric quantity of cathode reactant flowing to two discrete cathode sides of the fuel cell system. The varying of the stoichiometric quantity of cathode reactant can be between two predetermined values. The varying of the stoichiometric quantity can be during a steady state power demand placed on the system and/or during transients in a power demand placed on the system. The airmover that supplies the cathode reactant stream can be operated in a substantially continuous manner during a continuous power demand placed on the fuel cell system.

29 Claims, 3 Drawing Sheets

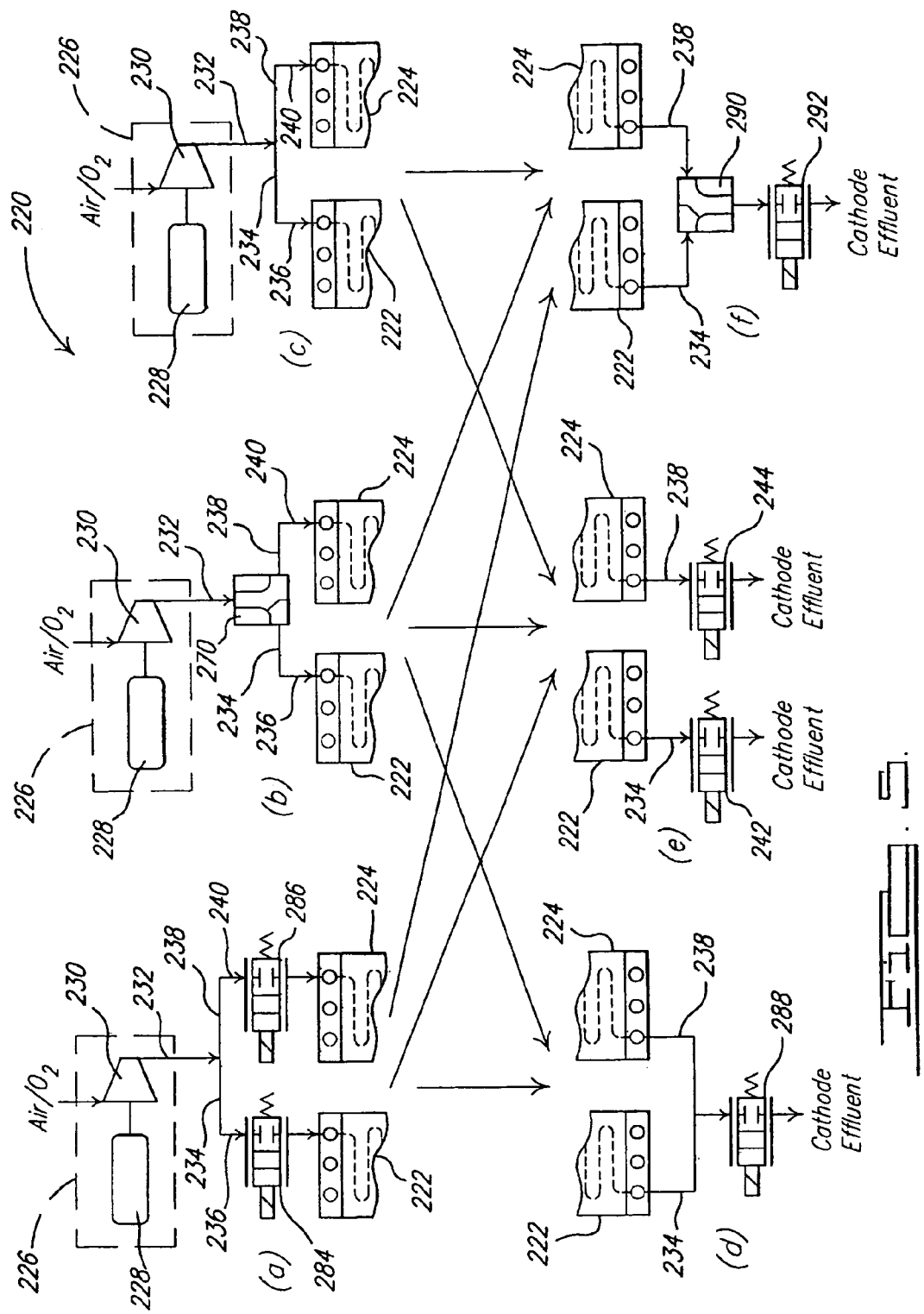

DYNAMIC CATHODE GAS CONTROL FOR A FUEL CELL SYSTEM

FIELD OF THE INVENTION

The present invention relates to fuel cell systems and more particularly to dynamic control of the cathode gas in a fuel cell system.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells (a.k.a. SPE (solid polymer electrolyte) fuel cells) are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

During the conversion of the anode and cathode reactants into electrical energy, the fuel cell, regardless of the type, produces anode and cathode effluents that are exhausted from the fuel cell stack. Water (also known as product water) is generated at the cathode electrode based on electric-chemical reactions between hydrogen and oxygen occurring within the MEA. Efficient operation of the fuel cell stack depends on the ability to provide proper and effective water management in the system.

During operation of the fuel cell stack, the cathode reactant is typically supplied with an excess amount (stoichiometric amount larger than 1.0). The excess cathode reactant is used due to the oxygen partial pressure in the flow fields of the fuel cell stack decreasing as the reactions occur throughout the fuel cell stack. Another reason for supplying excess cathode reactant is to assist in the removal of liquid water from the cathode side of the fuel cell stack. While the performance of the fuel cell stack benefits from the higher stoichiometric quantity of cathode reactant, a lower stoichiometric quantity will be favorable for an efficiency point of view due to the necessity of supplying power to the airmover (a parasitic device) to supply the cathode reactant. Thus, it would be advantageous to develop an operation strategy which satisfies the needs (product water removal and stable electricity production) of a fuel cell stack but maintains a power demand placed upon the air machinery low.

SUMMARY OF THE INVENTION

Typically, when a constant power demand is placed on a fuel cell stack, the fuel cell stack is supplied a constant cathode reactant flow. The cathode reactant flow is typically provided by an airmover, such as a blower or a compressor. The airmover also supplies the cathode reactant flow at a pressure level which is needed by the fuel cell stack and is defined by other operating conditions, such as a fuel cell temperature. The fuel cell stack outlet pressure is controlled by a back pressure valve. When the airmover supplies a constant flow of cathode reactant, the airmover will consume a specific quantity of power. The inventors have discovered that by pulsing the flow of cathode reactant flowing through the cathode side of the fuel cell stack, instead of supplying a constant cathode reactant flow, the required water removal on the cathode side can be satisfied while reducing the average stoichiometric quantity of cathode reactant supplied to the fuel cell stack. The pulsing includes varying the stoichiometric quantity of cathode reactant being supplied to the fuel cell stack between two distinct values. The higher stoichiometric quantity is chosen to satisfy the need for water removal while the lower stoichiometric quantity is selected to be sufficient for the transport of the reactant and stable electricity production. This results in an average stoichiometric quantity of cathode reactant being supplied to the fuel cell stack that is lower than that supplied when not pulsing the cathode reactant. Thus, in the present invention, the average electrical power demand of the airmover is expected to be lower. This lower power demand helps with system efficiency.

To pulse the cathode reactant between the two distinct stoichiometric quantities, when being supplied to a single cathode side of a fuel cell stack, requires the airmover to be operated at varying speeds or levels. The adjusting of the airmover between these levels, however, can produce a noise pattern that may be annoying to a user, especially when a constant power demand is placed on the fuel cell system and/or when the fuel cell system is used on a mobile platform. When used on a mobile platform, a user typically expects a steady sound to be heard during substantially steady state power demand. During transients in the power demand, the user typically expects a change in the sound produced by the fuel cell system. The potentially disconcerting noise can be avoided by the use of two or more fuel cell stacks or a fuel cell stack having a cathode reactant flow path which is partitioned into two or more discrete sections. With this configuration, the airmover can be operated at a substantially constant rate to supply a substantially constant flow of cathode reactant. The cathode reactant stream is varyingly partitioned to the two or more fuel cell stacks or sections of a single fuel cell stack between upper and lower stoichiometric levels. In other words, the cathode reactants flowing to the two or more fuel cell stacks or the two or more cathode sections are pulsed between upper and lower levels and coordinated so that the entire continuous flow of cathode reactant supplied by the airmover is utilized. Thus, the benefits of pulsing the cathode reactant can be realized while the airmover is operated at a substantially constant level, thereby avoiding the production of annoying or disconcerting noise. Furthermore, the present invention can also be used during dynamic loading on the fuel cell stack(s) wherein the pulse period and/or flow pattern can be changed as a function of the load demand placed upon the fuel cell system.

A fuel cell system according to the principles of the present invention includes at least one fuel cell stack and at least two cathode sides. There are first and second cathode reactant flow paths communicating with a respective first and second of the cathode sides. There is an airmover operable to supply a cathode reactant stream to the cathode sides. A first portion of the cathode reactant stream flows through the first flow path and the first cathode side while a second portion of the cathode reactant stream flows through the second flow path and the second cathode side. There are at least two flow restricting devices communicating with the flow paths. The flow restricting devices are operable to selectively vary a stoichiometric quantity of cathode reactant in the first and second portions of the cathode reactant stream between predetermined values.

A method of operating a fuel cell system having at least one fuel cell stack and at least two discrete cathode sides is also disclosed. The method includes: (1) supplying a cathode reactant stream; (2) routing a first portion of the cathode reactant stream to a first one of the cathode sides via a first cathode reactant flow path; (3) routing a second portion of the cathode reactant stream to a second one of the cathode sides via a second cathode reactant flow path; and (4) varying a stoichiometric quantity of cathode reactant in the first and second portions of the cathode reactant streams.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a schematic representation of various mechanization options for a fuel cell system according to alternate embodiments of the present invention.

DETAILED DESCRIPTION OF THE PREFERRED EMBODIMENTS

The following description of the preferred embodiments is merely exemplary in nature and is in no way intended to limit the invention, its application, or uses.

As used herein, the term module refers to an application specific integrated circuit (ASIC), an electronic circuit, a processor (shared, dedicated or group) and memory that executes one or more software or firmware programs, a combinational logic circuit, or other suitable components that provide the described functionality.

Figure 1:
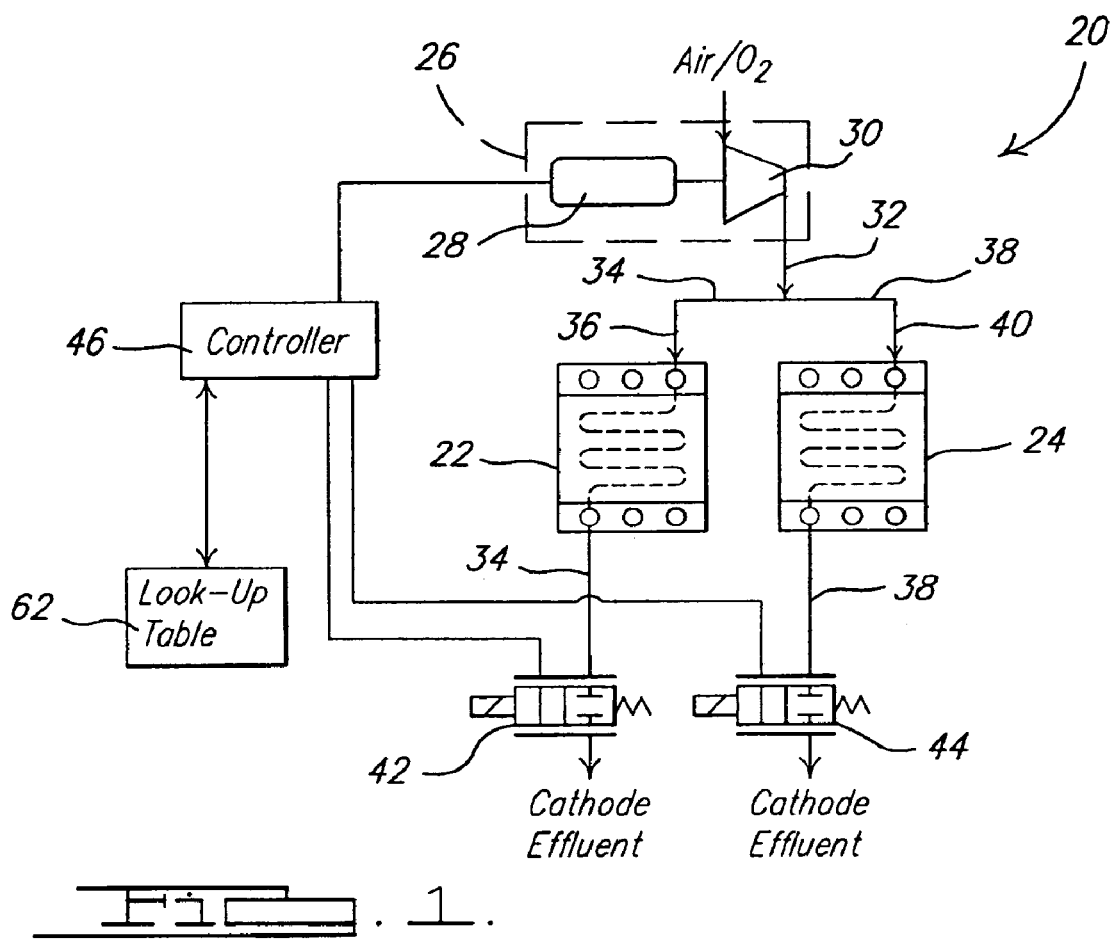
FIG. 1 is a schematic representation of a first preferred embodiment of a fuel cell system according to the principles of the present invention.

Referring to FIG. 1, a first preferred embodiment of a fuel cell system 20 according to the principles of the present invention is schematically represented. Fuel cell system 20 includes first and second fuel cell stacks 22 and 24 that each have an anode side and a cathode side for receiving respective hydrogen-containing anode reactant and oxygen-containing cathode reactant. Each fuel cell stack 22, 24 is operable to convert the anode and cathode reactants into electricity, a hydrogen-containing anode effluent and an oxygen-containing cathode effluent.

The hydrogen-containing anode reactant can be provided from a variety of sources. Such sources include, but are not limited to, a reformate stream from a reformer and hydrogen from a hydrogen storage device. The anode reactant supply to the fuel cell stacks and the venting of anode effluent produced in the fuel cell stacks will not be discussed in detail. It should be understood that anode reactant will be supplied to the various fuel cell stacks in a quantity sufficient to meet the operational demands of fuel cell system 20 and that anode effluent will be removed from fuel cell system 20 as needed.

The cathode reactant can also be provided from a variety of sources. Such sources include, but are not limited to, oxygen supplied from a storage device and air drawn from the environment within which fuel cell system 20 is employed. When drawn from the atmosphere, the cathode reactant is supplied via an airmover 26. Airmover 26 can come in a variety of forms. Airmover 26 can include a motor 28 and a compressor 30 which is driven by motor 28. Alternatively, a blower can be used in place of the compressor. When the cathode reactant is supplied by a storage device, the cathode reactant may be stored at a pressure sufficient to cause the cathode reactant to flow into the fuel cell stacks such that an airmover is not necessary. Regardless of the use of airmover 26 or a pressurized storage device, a cathode reactant stream 32 is formed that is used to supply cathode reactant to the fuel cell stacks. A first cathode reactant flow path 34 is operable to supply a first portion 36 of cathode reactant stream 32 to first fuel cell stack 22 and to exhaust cathode effluent from the cathode side of first fuel cell stack 22. Similarly, a second cathode reactant flow path 38 is operable to supply a second portion 40 of cathode reactant stream 32 to the cathode side of second fuel cell stack 24 and to exhaust cathode effluent from the cathode side of second fuel cell stack 24.

A flow restricting device 42 is disposed in first cathode reactant flow path 34 downstream of the cathode side of first fuel cell stack 22 while another flow restricting device 44 is disposed in second cathode reactant flow path 38 downstream of the cathode side of second fuel cell stack 24. Flow restricting devices 42, 44 are operable to restrict flow through the first and second flow paths 34 and 38, respectively. Flow restricting devices 42, 44 enable the proportioning of cathode reactant stream 32 between the first and second portions 36, 40 by varying the flow resistance in flow paths 34, 38, as discussed in more detail below. Flow restricting devices 42, 44 can come in a variety of forms. For example, flow restricting devices 42, 44 can be any type of device that allows for selectively adjusting the resistance to flow within cathode reactant flow paths 34, 38. Such flow restricting devices may include, but are not limited to, proportional valves, butterfly valves, solenoid valves, gate valves, ball valves, throttle valves and the like. The specific type of flow restricting device will depend upon the size of the cathode reactant flow paths, the volumetric flow rate of cathode reactant/cathode effluent through the flow paths and the required flow capacities.

A controller 46 uses one or more modules to control and coordinate the operation of the various components of fuel cell system 20 to meet a power demand placed upon fuel cell system 20. Controller 46 communicates with airmover 26 to supply the required quantity of cathode reactant within cathode reactant stream 32. Controller 46 also communicates with flow restricting devices 42, 44 to selectively control their operation so that a desired stoichiometric quantity of cathode reactant is present in first and second portions 36, 40 of cathode reactant stream 32 flowing to the cathode sides of fuel cell stacks 22, 24, respectively. Flow restricting devices 42, 44 are also operated to control the pressure within the cathode sides of fuel cell stacks 22, 24. The controlling of the pressure within the cathode sides of fuel cell stacks 22, 24 is typically used for a variety of reasons. For example, for best stability and efficiency of the fuel cell stack a certain range of operating pressure is favorable. This includes the control of the favorable cathode outlet relative humidity which is influenced by the pressure. Another reason can be to maintain a pressure differential between the anode and cathode sides below a predetermined value.

In operation, controller 46 monitors the power demand placed upon fuel cell system 20 and adjusts the operation of the various components of fuel cell system 20 to meet that power demand. Controller 46 commands airmover 26 to supply a desired stoichiometric quantity of cathode reactant within cathode reactant stream 32. Controller 46 adjusts flow restricting devices 42, 44 to partition cathode reactant stream 32 between first and second portions 36, 40 so that a desired stoichiometric quantity of cathode reactant is supplied to the cathode sides of first and second fuel cell stacks 22, 24. Specifically, cathode reactant stream 32 will follow the path of least resistance when flowing through cathode reactant flow paths 34, 38. By varying the resistance in flow paths 34, 38 with flow restricting devices 42, 44 controller 46 can partition cathode reactant stream 32 between first and second portions 36, 40 in a desired manner. Controller 46 can thereby cause the stoichiometric quantity of cathode reactant within the cathode side of each fuel cell stack to (1) be the same; (2) be different; (3) vary between predetermined values; (4) be increasing; (5) be decreasing; or (6) be a constant valve.

Figure 2:
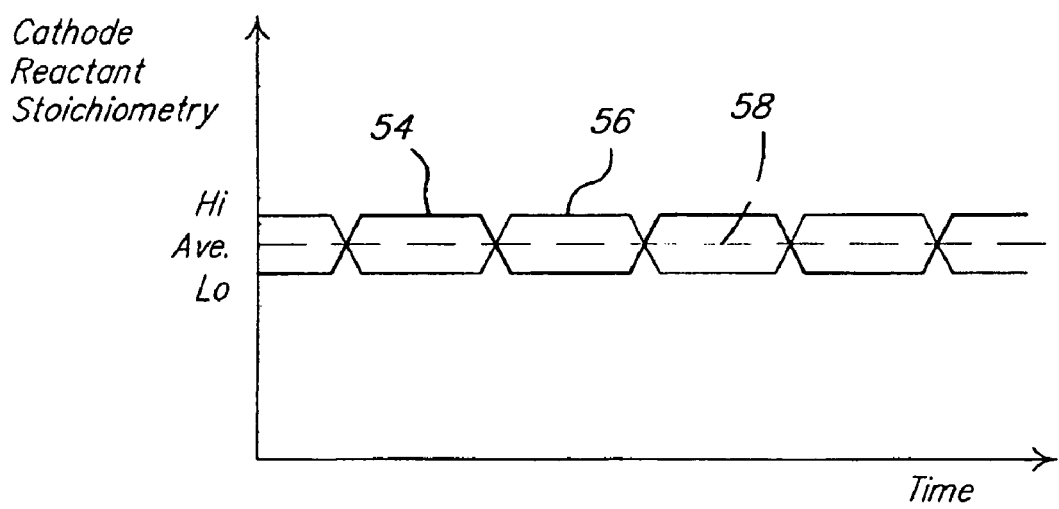
FIG. 2 is a graph of exemplary stoichiometric values of two partitioned cathode reactant streams as a function of time.

The power demand placed on fuel cell system 20 can be a constant power demand, an increasing or upward transient, or a decreasing or downward transient. During these different power demands placed on fuel cell system 20, controller 46 adjusts the manner and the stoichiometric quantity of cathode reactant flowing to the cathode sides of fuel cell stacks 22, 24. During a period of substantially constant power demand placed on fuel cell system 20, controller 46 preferably causes the stoichiometric quantity of cathode reactant flowing through the cathode sides of each fuel stack 22, 24 to vary between a first predetermined stoichiometric quantity (a high level) and a second predetermined stoichiometric quantity (a low level) as a function of time. For example, as shown in FIG. 2, the stoichiometric quantity of cathode reactant flowing in the cathode side of first fuel cell stack 22 will vary as a function of time between the low level and the high level, as indicated by curve 54. Similarly, the stoichiometric quantity of cathode reactant flowing in the cathode side of second fuel cell stack 24 is also varied between the high level and the low level as a function of time, as indicated by curve 56. The result is that the cathode sides of both fuel cell stacks 22, 24 receive an average stoichiometric quantity indicated by curve 58. The total stoichiometric quantity of cathode reactant in cathode reactant stream 32 is maintained constant while the partitioning of cathode reactant stream 32 into first and second portions 36, 40 is performed by controller 46 and flow restricting devices 42, 44.

Thus, during substantially constant power demand placed on fuel cell system 20, airmover 26 can be operated at a substantially constant rate to supply a constant stoichiometric quantity of cathode reactant in cathode reactant stream 32 while the stoichiometric quantity flowing through the cathode sides of fuel cell stacks 22, 24 can be varied between the two predetermined values. The first or high predetermined value is chosen to provide a sufficient velocity to remove water from the cathode sides of the fuel cell stacks. The second or low predetermined value is chosen so that a sufficient stoichiometric quantity of cathode reactant is present to produce stable operation of the fuel cell stacks within the desired voltage range while meeting the power demand placed upon fuel cell system 20. As a result, the average stoichiometric quantity of cathode reactant flowing through the cathode sides of fuel cell stacks 22, 24 is lower than that required when not pulsing the stoichiometric quantities while still producing an equal or greater power output. In other words, the pulsing of the stoichiometric quantity of cathode reactant enables a balancing between the need for water removal and supplying excess cathode reactant and the efficient operation of the fuel cell stacks by providing a lower stoichiometric quantity of cathode reactant to meet the power demands placed on fuel cell system 20.

During upward or downward transients in the power demand placed on fuel cell system 20, controller 46 will command airmover 26 to increase or decrease the stoichiometric quantity of cathode reactant in cathode reactant stream 32 as necessitated by the power demand on fuel cell system 20. During these upward and downward transients, flow restricting devices 42, 44 can continue to be controlled to pulse or vary the quantity of cathode reactant without pulsing flow to the cathode sides of fuel cell stacks 22, 24 between predetermined values. If desired, however, fuel cell system 20 can be operated during upward and downward transients to provide an increasing or decreasing stoichiometric quantity of cathode reactant without pulsing to the cathode reactant sides of fuel cell stacks 22, 24 as necessitated by the power demand placed on fuel cell system 20. In other words, controller 46 can cause flow restricting devices 42, 44 to provide a fixed or constant partitioning of cathode reactant stream 32 between first and second portions 36, 40 while the total stoichiometric quantity of cathode reactant within cathode reactant stream 32 increases or decreases to meet the power demand placed on fuel cell system 20. Optionally, during the upward or downward transients, a fixed or constant partition for a set period of time can be supplemented with a varying of the partition between first and second portions 36, 40 for a different period of time.

Controller 46 can adjust the frequency at which the partitioning of cathode reactant stream 32 occurs and the magnitude of the variations. Furthermore, the curves shown in FIG. 2 are merely representative of one type of control scheme and it should be appreciated the curves can take other forms. For example, the curves could be sinusoidal or may have step changes with faster or slower transitions between the predetermined stoichiometric quantity values. Controller 46 can also control the variations of the partitions so that a pressure difference between the cathode and anode sides of the fuel cell stacks is maintained below a predetermined value. By maintaining the pressure differential below a predetermined value, damage to the internal components separating the cathode and anode sides of the fuel cell stacks can be avoided.

Controller 46 can use a number of different scenarios to adjust flow restricting devices 42, 44 and for controlling fuel cell system 20. For example, controller 46 can use an algorithm that provides a desired frequency and magnitude of the partitioning of cathode reactant stream 32 between fuel cell stacks 22, 24 based upon operating conditions of fuel cell system 20. Additionally, controller 46 can utilize a look-up table 62 to determine the appropriate frequency and magnitude for partitioning of cathode reactant stream 32 between first and second fuel cell stacks 22, 24 based upon the operating conditions of fuel cell system 20.

Thus, the first preferred embodiment of the present invention allows the partitioning of cathode reactant stream 32 between first and second portions 36, 40 to vary the stoichiometric quantities of cathode reactant flowing through the cathode sides of fuel cell stacks 22, 24 as a function of time. The varying of the stoichiometric quantity of cathode reactant enables the removal of product water produced on the cathode sides along with maintaining the stable operation of the fuel cells. Furthermore, the stable operation and water removal are performed with an average stoichiometric quantity of cathode reactant flowing through the cathode sides that is typically less than the stoichiometric quantity of cathode reactant utilized when not varying or pulsing the stoichiometric quantity.

Figure 3:
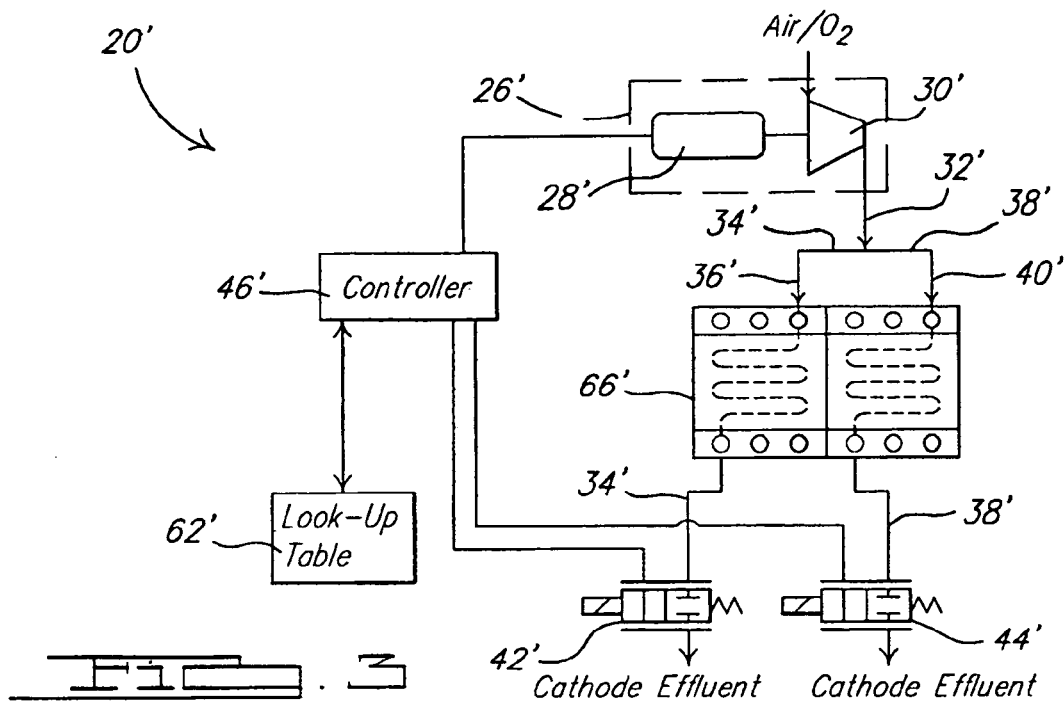
FIG. 3 is a schematic representation of a second preferred embodiment of a fuel cell system according to the principles of the present invention.

Referring now to FIG. 3, a second preferred embodiment of a fuel cell system 20' according to the principles of the present invention is shown. In the second preferred embodiment, fuel cell system 20' includes a single fuel cell stack 66' that is partitioned to have two discrete cathode sides. In other words, fuel cell stack 66' is essentially a single fuel cell stack with the cathode partitioned to two sections. Fuel cell system 20' is substantially the same as fuel cell system 20 with the difference being that the two fuel cell stacks are combined into single partitioned fuel cell stack 66'. Airmover 26' is controlled by controller 46' to supply cathode reactant stream 32' to fuel cell stack 66'. Cathode reactant stream 32' is partitioned into first and second portions 36', 40' that are fed to the two discrete cathode sides of fuel cell stack 66' via first and second cathode reactant flow paths 34', 38'. Flow restriction devices 42', 44' are disposed in first and second cathode reactant flow paths 34', 38' downstream of the cathode sides of fuel cell stack 66'. Flow restriction devices 42', 44' vary flow resistance within flow paths 34', 38' to partition cathode reactant stream 32' between first and second portions 36', 40'. Thus, fuel cell system 20' can be operated in a manner substantially identical to that disclosed above in reference to fuel cell system 20 with the difference being that the single fuel cell stack 66' is partitioned to function as the first and second fuel cell stacks 22, 24.

Figure 4:
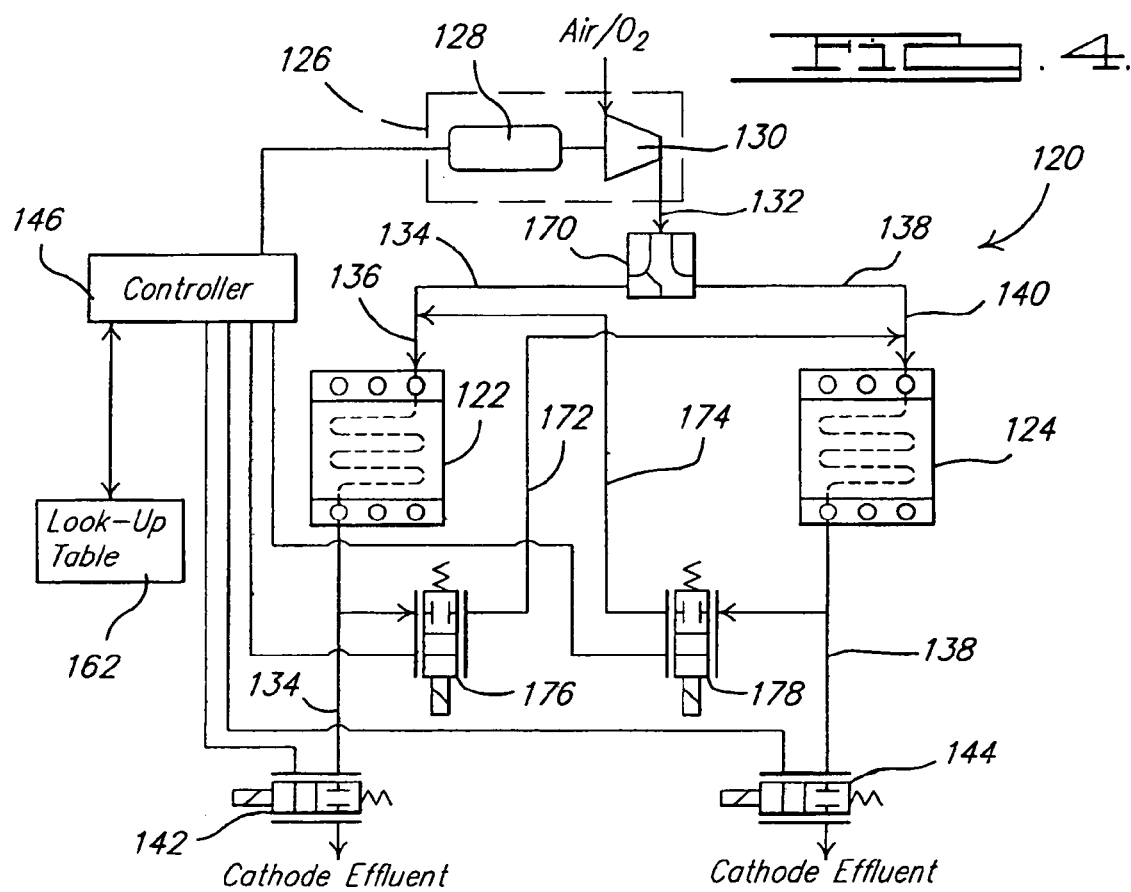
FIG. 4 is a first alternate embodiment of the fuel cell system of FIG. 1 with cathode effluent recycle flow paths.

Referring now to FIG. 4, a first alternate embodiment of the first preferred embodiment of fuel cell system 20 is shown and indicated generally as fuel cell system 120. Fuel cell system 120 is substantially the same as fuel cell system 20 with the addition of cathode effluent recycle flow paths 172, 174 with flow restricting devices 176, 178 therein. First, recycle flow path 172 interconnects first cathode reactant flow path 134 downstream of the cathode side of first fuel cell stack 122 to the second cathode reactant flow path 138 upstream of the cathode side of second fuel cell stack 124. Similarly, second recycle flow path 174 interconnects second cathode reactant flow path 138 downstream of the cathode side of second fuel cell stack 124 to first cathode reactant flow path 134 upstream of the cathode side of first fuel cell stack 122. Thus, first recycle flow path 172 enables a portion of cathode effluent exiting the first fuel cell stack 122 to flow into the inlet of the cathode side of second fuel cell stack 124. Similarly, second recycle flow path 174 enables a portion of cathode effluent exiting second fuel cell stack 124 to flow into the inlet of the cathode side of first fuel cell stack 122. Controller 146 selectively allows cathode effluent from one fuel cell stack to enter the cathode side of the other fuel cell stack by selectively operating flow restricting devices 176, 178. The flow of cathode effluent from one fuel cell stack to the inlet of another fuel cell stack is caused by pressure differentials between the different flow paths.

Another difference is the use of a variable flow divider 170 which selectively partitions cathode reactant stream 132 into first and second portions 136, 140. Divider 170 is controlled by controller 146 to partition cathode reactant flow 132 as desired. In this embodiment, flow restricting devices 142, 144 are used for controlling the pressure within the cathode sides of fuel cell stacks 122, 124. Flow restricting devices 142, 144 are selectively operated to restrict the venting of cathode effluent from the associate fuel cell stack. By controlling the discharging of cathode effluent from the fuel cell stacks, the pressure in the cathode sides of the fuel cell stacks can be controlled. Controller 146 controls operation of flow restricting devices 176, 178 in synchronization with divider 170 and flow restricting devices 142, 144 to selectively enable cathode effluent to flow from one fuel cell stack to the other at an appropriate time when a pressure differential is present. The recycling of cathode effluent allows for unused oxygen in the cathode effluent to be recycled and used to convert into electrical energy in the cathode side of the fuel cell stack into which it is routed. Additionally, as the cathode effluent contains product water, the recycling of the cathode effluent provides a certain humidification of the cathode inlet flow to the other stack, which, depending on the operating conditions, may be required to have a minimum humidity. Under certain conditions, restricting devices 176 and 178 could be passive devices like check-valves.

Referring now to FIG. 5, other mechanization options for a fuel cell system according to the principles of the present invention are disclosed, including the preferred embodiment shown in FIG. 1. These alternate mechanization options include various ways of partitioning the cathode reactant stream supplied by the airmover 226 between the fuel cell stacks and controlling of the pressure in the cathode sides of the fuel cell stacks. In FIG. 5, three different mechanization options for the flow paths upstream of the fuel cell stacks are indicated as (a), (b), and (c) while three different mechanization options for the flow paths downstream of the fuel cell stacks are indicated as (d), (e), and (f). The arrows linking the upstream mechanization to the downstream mechanization indicates the permissible combinations. For simplicity, the controller is not shown in FIG. 5. It should be appreciated that a controller will be employed regardless of the combination utilized to control and coordinate the various components of a fuel cell system and to pulse or vary the cathode reactant flowing through the cathode side of the fuel cell stacks in response to the operating conditions of the fuel cell system.

As indicated in FIG. 5, upstream mechanization (a) can be used in conjunction with downstream mechanizations (d), (e) or (f). Upstream mechanization (a) utilizes flow restricting devices 284, 286 disposed within respective first and second cathode reactant flow paths 234, 238 and are operated to partition cathode reactant stream 232 between first and second portions 236, 240. Downstream mechanization (d) utilizes a flow restricting device 288 to control the pressure in the cathode sides of fuel cell stacks 222, 224. Thus, when upstream mechanization (a) is used in conjunction with downstream mechanization (d), upstream flow restricting devices 284, 286 are used to partition cathode reactant stream 232 while downstream flow restricting device 288 is used to control the pressure within the cathode sides of fuel cell stacks 222, 224.

Another option is to utilize upstream mechanization (a) with downstream mechanization (e). In this configuration, flow restricting devices 284, 286 in conjunction with downstream flow restricting devices 242, 244 are operated to partition cathode reactant stream 232 between first and second portions 236, 240 and to control the pressure in the cathode sides of fuel cell stacks 222, 224.

Another option is to utilize upstream mechanization (a) in conjunction with downstream mechanization (f). In this configuration, upstream flow restricting devices 284, 286 in conjunction with a downstream variable flow divider 290 are used to partition cathode reactant stream 232 into first and second portions 236, 240. A downstream flow restricting device 292 is utilized to control the pressure in the cathode sides of fuel cell stacks 222, 224.

Upstream mechanization (b) can be used in conjunction with downstream mechanizations (d), (e) or (f). Upstream mechanization (b) utilizes an upstream variable flow divider 270 to partition cathode reactant stream 232 into first and second portions 236, 240. When upstream mechanization (b) is combined with downstream mechanization (d), downstream flow restricting device 288 provides back pressure control and controls the pressure in the cathode sides of fuel cell stacks 222, 224.

When upstream mechanization (b) is used in combination with downstream mechanization (e), upstream flow divider 270 is used to partition cathode reactant stream 232 into first and second portions 236, 240. Downstream flow restricting devices 242, 244 are utilized for back pressure control to control the pressure in the cathode sides of fuel cell stacks 222, 224. Downstream flow restricting devices 242, 244 can also be coordinated with the operation of flow divider 270 to facilitate the partitioning of cathode reactant stream 232 into first and second portions 236, 240.

When upstream mechanization (b) is used in combination with downstream mechanization (f), upstream and downstream variable flow dividers 270, 290 are coordinated to partition cathode reactant stream 232 into first and second portions 236, 240. Downstream flow restricting device 292 is utilized to control the pressure within the cathode sides of fuel cell stacks 222, 224.

Upstream mechanization (c) can be used in conjunction with downstream mechanization (e), thereby forming the first preferred embodiment of the present invention, and with downstream mechanization (f). In upstream mechanization (c), there are no upstream flow restricting devices or flow divider and this mechanization relies upon the downstream mechanization to partition cathode reactant stream 232 into first and second portions 236, 240 and to provide back pressure control. Thus, upstream mechanization (c) cannot be used in combination with downstream mechanization (d) because there are no devices to partition cathode reactant stream 232. The combination of upstream mechanization (c) with downstream mechanization (e) is the first preferred embodiment, the operation of which is discussed above. When upstream mechanization (c) and used in combination with downstream mechanization (f), flow divider 290 is operated to partition cathode reactant stream 232 into first and section portions 236, 240. Downstream flow restricting device 292 controls the pressure in the cathode sides of fuel cell stacks 222, 224.

Thus, in the alternate embodiments shown in FIG. 5, a variety of different combinations of upstream and downstream mechanization options can be employed to provide partitioning of cathode reactant stream 232 and varying of the stoichiometric quantity of cathode reactant flowing to the cathode sides of fuel cell stacks 222, 224. Additionally, a back pressure control device is also utilized to control the pressure within the cathode sides of the fuel cell stacks.

The above description of the invention is merely exemplary in nature and, thus, variations that do not depart from the gist of the invention are intended to be within the scope of the invention. For example, it should be appreciated that while two fuel cell stacks are shown as being utilized, more than two fuel cell stacks can be utilized and a similar or substantially the same control scheme employed to partition the cathode reactant stream among the various fuel cell stacks that are utilized. Furthermore, it should also be appreciated that a single fuel cell stack can be utilized and partitioned into a desired number of discrete cathode flow paths and the various mechanization options employed treating each partitioned cathode side as a discrete fuel cell stack. Thus, such variations are not to be regarded as a departure from the spirit and scope of the invention.

What is claimed is:

1. A method of operating a fuel cell system having at least one fuel cell stack and at least two discrete cathode sides, the method comprising:
   (a) determining a first power demand on the at least one fuel cell stack;
   (b) determining first and second stoichiometric quantities of cathode reactant to supply to at least one of the at least two cathode sides based on the first power demand;
   (c) supplying a cathode reactant stream;
   (d) routing a first portion of said cathode reactant stream to a first one of the cathode sides via a first cathode reactant flow path;
   (e) routing a second portion of said cathode reactant stream to a second one of the cathode sides via a second cathode reactant flow path; and
   (f) varying a quantity of cathode reactant in at least one of said first and second portions of said cathode reactant stream between the determined first and second stoichiometric quantities, which remain unchanged as a power demand on the fuel cell stack remains constant at the first power demand, such that at least one of the first and second cathode sides receives cathode reactant at a quantity that varies back and forth between the first and second stoichiometric quantities over time while the power demand on the fuel stack remains constant at the first power demand.

2. The method of claim 1, wherein (f) includes changing a flow resistance in said flow paths.

3. The method of claim 2, wherein changing a flow resistance in said flow paths includes changing a flow resistance in said flow paths downstream of the cathode sides.

4. The method of claim 2, wherein changing a flow resistance in said flow paths includes changing a flow resistance in said flow paths upstream of the cathode sides.

5. The method of claim 2, wherein changing a flow resistance in said flow paths includes changing a flow resistance in said flow paths both upstream and downstream of the cathode sides.

6. The method of claim 2, wherein the fuel cell system includes at least two valves communicating with the cathode flow paths and changing a flow resistance in said flow paths includes operating said at least two valves to change said flow resistance.

7. The method of claim 1, wherein (f) includes maintaining a minimum stoichiometric flow rate of cathode reactant into each of the cathode sides.

8. The method of claim 1, wherein (f) is performed during substantially steady state power demand placed on the fuel cell system.

9. The method of claim 1, wherein (f) is performed during transients in a power demand placed on the fuel cell system.

10. The method of claim 1, wherein (f) includes varying said quantity of cathode reactant at a predetermined frequency.

11. The method of claim 1, wherein (f) includes varying said quantity of cathode reactant in each of said first and second portions between the determined first and second stoichiometric quantities such that both of the first and second cathode sides receive cathode reactant at a quantity that varies back and forth between the first and second stoichiometric quantities over time while a power demand on the fuel stack remains at the first power demand.

12. The method of claim 1, wherein said at least one fuel cell stack is at least two fuel cell stacks and the first and second cathode sides are associated with a respective first and second one of the fuel cell stacks, (d) includes routing a first portion of said cathode reactant stream to the cathode side of the first one of the fuel cell stacks via said first cathode reactant flow path, and (e) includes routing a second portion of said cathode reactant stream to the cathode side of the second one of the fuel cell stacks via said second cathode reactant flow path.

13. The method of claim 12, further comprising:
routing a portion of a cathode effluent exiting said first fuel cell stack to the cathode side of said second fuel cell stack;
routing a portion of a cathode effluent exiting said second fuel cell stack to the cathode side of said first fuel cell stack; and
varying said routing of said cathode effluent to the cathode sides of said first and second fuel cell stacks.

14. The method of claim 1, wherein (e) includes routing a remaining portion of said cathode reactant stream to the second cathode side.

15. A method of operating a fuel cell system having at least one fuel cell stack and at least two discrete cathode sides, the method comprising:
(a) supplying a cathode reactant stream of a constant value;
(b) routing a first portion of said cathode reactant stream to a first one of the cathode sides via a first cathode reactant flow path;
(c) routing a second portion of said cathode reactant stream to a second one of the cathode sides via a second cathode reactant flow path; and
(d) varying a stoichiometric quantity of cathode reactant in at least one of said first and second portions of said cathode reactant stream between two predetermined stoichiometric magnitudes which remain unchanged while a power demand on the at least one fuel cell stack remains at a constant level,
wherein the fuel cell system includes an airmover and (a) includes supplying said cathode reactant stream with said airmover and operating said airmover at a substantially constant rate while the power demand remains at the constant level and the stoichiometric quantity is varied.

16. A fuel cell system comprising:
at least one fuel cell stack;
at least two cathode sides;
first and second cathode reactant flow paths communicating with a respective first and second of said cathode sides;
an airmover operable to supply a cathode reactant stream to said cathode sides to meet a power demand;
a first portion of said cathode reactant stream flowing through said first flow path and said first cathode side;
a second portion of said cathode reactant stream flowing through said second flow path and said second cathode side; and
at least two flow restricting devices communicating with said flow paths, said flow restricting devices selectively varying a quantity of cathode reactant in at least one of said first and second portions of said cathode reactant stream between first and second stoichiometric values which remain unchanged while a power demand on the at least one fuel cell stack remains at a constant level such that the quantity of cathode reactant in at least one of the first and second portions varies back and forth between the first and second stoichiometric values.

17. The fuel cell system of claim 16, wherein said at least two flow restricting devices vary said stoichiometric quantity by varying a flow resistance in said flow paths.

18. The fuel cell system of claim 17, wherein said at least two flow restricting devices vary a flow resistance in said flow paths downstream of said cathode sides.

19. The fuel cell system of claim 17, wherein said at least two flow restricting devices vary a flow resistance in said flow paths both upstream and downstream of said cathode sides.

20. The fuel cell system of claim 17, wherein said at least two flow restricting devices vary a flow resistance in said flow paths upstream of said cathode sides.

21. The fuel cell system of claim 16, wherein said at least two flow restricting devices vary said quantity of cathode reactant in said first and second flow paths at a predetermined frequency.

22. The fuel cell system of claim 21, wherein said predetermined frequency and said first and second stoichiometric values are based on a look-up table.

23. The fuel cell system of claim 16, wherein said at least one fuel cell stack is at least two fuel cell stacks each having a cathode side and an anode side, and said first and second cathode sides are associated with a respective first and second of said fuel cell stacks.

24. The fuel cell system of claim 23, further comprising:
a first cathode effluent recycle flow path extending between said first cathode reactant flow path downstream of said first fuel cell stack and said second cathode reactant flow path upstream of said second fuel cell stack;
a second cathode effluent recycle flow path extending between said second cathode reactant flow path downstream of said second fuel cell stack and said first cathode reactant flow path upstream of said first fuel cell stack; and
first and second recycle flow restricting devices operable to selectively restrict flow through said respective first and second cathode effluent recycle flow paths to control a quantity of cathode effluent flowing from one of said fuel cell stacks to another of said fuel cell stacks.

25. The fuel cell system of claim 16, wherein said airmover operates at a substantially constant speed during a substantially steady state power demand on the at least one fuel cell stack and while the quantity of cathode reactant in at least one of the first and second portions is varied.

26. The fuel cell system of claim 16, wherein said at least two flow restricting devices maintain a pressure differential between an anode side and a cathode side of said fuel cell stack below a predetermined magnitude.

27. The fuel cell system of claim 16, wherein said first and second stoichiometric values of cathode reactant are the same for both of said first and second portions.

28. The fuel cell system of claim 16, wherein said at least two flow restricting devices vary said quantity of cathode reactant in said first and second portions of said cathode reactant stream during a substantially steady state power demand placed on the fuel cell system.

29. The fuel cell system of claim 16, wherein said at least two flow restricting devices vary said quantity of cathode reactant in said first and second portions of said cathode reactant stream during a transient in a power demand placed on the fuel cell system.

* * * * *